H. K. PARSONS
OPHTHALMIC MOUNTING.
APPLICATION FILED OCT. 16, 1917.
1,290,330.
Patented Jan. 7, 1919.
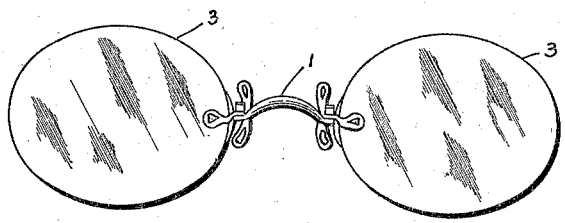
FIG. I
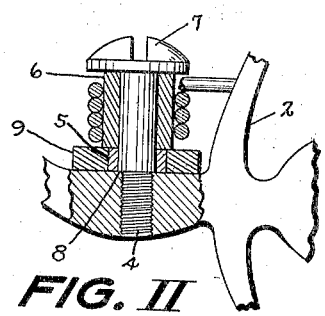
FIG. II
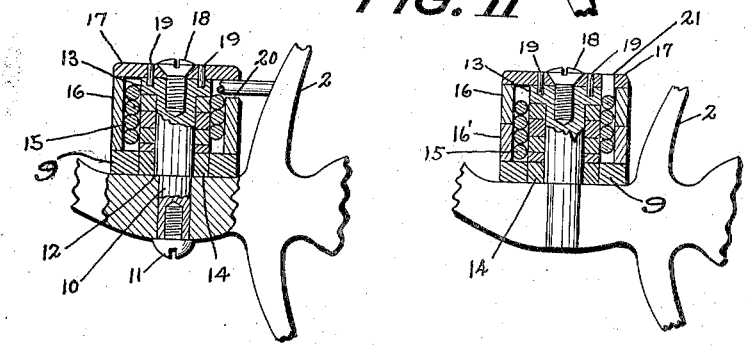
FIG. III    FIG. IV
INVENTOR
HAROLD K. PARSONS
BY
ATTORNEYS

UNITED STATES PATENT OFFICE.

HAROLD K. PARSONS, OF SOUTHBRIDGE, MASSACHUSETTS.

OPHTHALMIC MOUNTING.

1,290,330.     Specification of Letters Patent.     Patented Jan. 7, 1919.

Application filed October 16, 1917. Serial No. 196,800.

*To all whom it may concern:*

Be it known that I, HAROLD K. PARSONS, a citizen of the United States, residing at Southbridge, in the county of Worcester and State of Massachusetts, have invented certain new and useful Improvements in Ophthalmic Mountings, of which the following is a specification.

This invention relates to improvements in fingerpiece mountings and has particular reference to structures of what are known as the fingerpiece type, making use of spring actuated guard levers for retaining the mounting in position on the face of the wearer.

The principal object of the present invention is to eliminate to the largest possible degree wear and friction interfering with ease of operation of mountings as manufactured at the present time.

A further object of the present invention is the provision of an extremely neat appearing mounting in which friction will be reduced to a minimum, and in which the several working parts will be protected to a great degree against dirt or the like and the mounting itself will be much easier to keep in a neat condition than is possible with present commercial constructions.

Other objects and advantages of my improved construction should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting constructed in accordance with and embodying my invention.

Fig. II represents a vertical sectional view of one embodiment of my invention.

Fig. III is a similar view of another form thereof.

Fig. IV represents a view of another modification thereof.

In the drawings, the numeral 1 designates the bridge or supporting member of the mounting bearing at its ends the clips 2 for retaining in position the lenses 3.

In the form of my invention particularly illustrated in Fig. II, I have shown as rising from the support 1 the pivot screw 4 having mounted thereon the lower friction washer or disk 5 and the upper loose cylinder 6 of larger diameter than the member 5, the head 7 of the screw serving to retain these parts in position, a shoulder 8 on the screw engaging the bridge to limit its downward movement and prevent any binding of the parts 5 and 6. Pivotally mounted on the support 1 around the member 5 is the guard arm or fingerpiece lever 9, the member 5 thus serving as an anti-friction roller or bearing between the fixed post and the movable lever, loose as respects both of said parts, whereby friction between the parts is eliminated, and the loose member moving partially with one and partially with the other will prevent any sticking tending to loosen the pivot itself, and will allow of a greater freedom of movement of the fingerpiece lever 9 than is possible when this lever bears directly against the fixed member on the support.

It has been previously mentioned that the member 6 is of larger diameter than the member 5, and the purpose of this should be apparent by reference to Fig. II, in which it will be seen that the member 6 engages the inner portion of the lever 9 serving to limit the upward movement of the lever, although being sufficiently short to allow of slight vertical play of the lever and thus prevent any binding between the lever and the member 6. The cylinder being loosely mounted on the pivot screw may also turn with either the lever or with a gripping coil of the encircling spring as the fingerpiece lever is actuated, thus relieving the pivot of any gripping action of the spring and relieving the lever from the presence of a fixed or immovable member bearing against its upper face tending to interfere with the proper easy movement of the lever.

In Fig. III, I have shown a further modification of my invention, in which I employ a central tube or post 10 passing downward through the bridge and secured in position as by the screw 11, said post having a shoulder at 12 to limit its movement downward onto the bridge, and having an enlarged upper end, as at 13, serving as a head to limit upward movement of the series of anti-friction rings or washers 14 which are mounted on the post. The lower of said washers is adapted to readily move with or form a bearing for the pivoted lever 9, while the upper washers fit within the coils of the spring 15, whereby as the lever is actuated if any one coil tightens up in advance of the others and normally has a tendency to bind on the spring post in place of tightening on the fixed post the spring coil will tighten on one or at the most on the two adjacent washer members and cause those members to turn with the spring so that the spring action is communicated to both the upper and lower coils if it be an intermediate coil which first grips, as is frequently the case in a spring of this nature, the lower coil becomes tightened before much spring action occurs in the outer coils.

This spring action is a difficulty which is frequently met with in connection with mountings employing a spring of this nature as there may be a tendency of the spring to grip at a particular point, as at the bottom, or more often at two points, as at the bottom and top, on account of the bends and adjustments that may have been made at these points in fitting the spring to the mounting, and it is one of the essential purposes of my invention to get away from this difficulty by providing the plurality of loose washer members on the central post so that no matter if the spring grips at one or more points, these members having independent movement as respects each other may readily move with the spring coils and automatically adjust themselves so that the spring action occurs substantially throughout the entire length of the spring and maximum efficiency as well as maximum durability and wear of the spring is accomplished.

In the form of my invention now under consideration I preferably simply slip the lever down over the post and washers and to retain it in position may make use of the inclosing cylinder or barrel member 16, which is of size to just fit around and inclose the coils or working portion of the spring 15, and is retained in position as by the cap plate 17 fitted on top of the post and there secured by the screw 18, pins 19 serving to lock the cap plate against loosening.

It will be noted by reference to the drawings that the member 16 has the slot 20 through which the end of the spring extends to the mounting, and it is of sufficient height to normally provide a slight clearance between it and the cap plate 17 so that there is normally no friction on account of this steadying of the lever, but should the lever ride up slightly or tend to tip, the steadying barrel 16 will then engage the lever on the one side and the cap plate on the other and prevent tipping or weaving of the lever, while the barrel 16 being loose may either remain stationary with the cap plate or slide with the lever but to less extent than the movement of the lever, and thus minimize the frictional resistance to the swinging of the lever.

The form of invention illustrated in Fig. IV is quite similar to that in Fig. III, with the exception that the post is rigidly secured, as by soldering, to the bridge or support 1, and the cap plate 17 is provided with an aperture 21 to receive the upwardly bent end of the spring so that the spring is locked to the cap plate in place of extending outward into engagement with the mounting, being cut off just flush with the cap plate, while the inclosing barrel member may if desired be split into the portions 16 and 16', which may slide around as desired relative to each other so that the movement on rotation of the lever may be either a sliding movement between the two halves of the spring inclosing barrel, each half remaining with the part against which it bears on its outer end, or may be a movement of the barrel as an entirety, or any combination of the parts, the provision of the several relatively loose slidingly mounted parts attaining a minimum of friction, while at the same time the parts as shown entirely inclose the spring and other moving parts of the mounting, presenting the neatest possible appearance with the fewest surfaces and inequalities to gather dirt, thus rendering the mounting much easier to keep in a neat and cleanly condition than is the ordinary mounting with the spring coils and other parts liable to collect such dirt.

I claim:

1. In an ophthalmic mounting, the combination with a support, of a pivot rising therefrom, a lever, an actuating spring for the lever mounted around the post and separate and distinct anti-frictional devices interposed between the lever and the pivot and between the spring and the pivot.

2. In a device of the character described, the combination with a support, of a post rising from the support, a plurality of anti-frictional devices carried by the post, and a lever and an actuating spring therefor mounted on the post and held in spaced relation thereto by the anti-frictional devices.

3. In a device of the character described, the combination with a support, of a post rising from the support, a plurality of anti-frictional devices carried by the post, a lever and an actuating spring therefor mounted on the post and held in spaced relation thereto by the anti-frictional devices, a head on the post and a barrel member axial with the post and extending between the head and the lever to control the vertical movement of the lever with respect to the post.

4. A device of the character described, including a support, a post rising from the support, anti-frictional devices mounted on the post, a lever and an actuating spring therefor mounted on said anti-frictional devices, and a detachable cap on the post for securing the parts in position.

5. A device of the character described, including a support, a post rising therefrom, anti-frictional devices carried by the post, a lever having a portion encircling the post, a spring encircling the post for actuating the lever, said anti-frictional devices holding said parts in spaced relation to the post, a barrel resting on the lever and of size to inclose the spring and post, and means on the post for retaining the several parts in position, whereby the barrel serves to conceal the spring and post and serves as an anti-friction device limiting upward or weaving movement of the lever as respects the support.

In testimony whereof I have affixed my signature, in presence of two witnesses.

HAROLD K. PARSONS.

Witnesses:
H. E. COLEMAN,
E. M. HALVORSEN.

Copies of this patent may be obtained for five cents each, by addressing the "Commissioner of Patents, Washington, D. C."